(12) United States Patent
Miller et al.

(10) Patent No.: US 6,286,007 B1
(45) Date of Patent: Sep. 4, 2001

(54) METHOD AND SYSTEM FOR EFFICIENTLY STORING AND VIEWING DATA IN A DATABASE

(75) Inventors: Clinton Frederick Miller, Austin; Paul Gerard Villarrubia, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,901

(22) Filed: Oct. 13, 1998

(51) Int. Cl.[7] .................................................. G06F 9/00
(52) U.S. Cl. ............................................... 707/101; 707/6
(58) Field of Search ........................................ 707/1–204

(56) References Cited

U.S. PATENT DOCUMENTS 5,339,392 * 8/1994 Risberg et al. ..................... 395/161
5,970,590 * 10/1999 Morgenstern ......................... 707/10

* cited by examiner

Primary Examiner—Thomas Black
Assistant Examiner—John G. Mills
(74) Attorney, Agent, or Firm—Anthony V. S. England; Bracewell & Patterson, L.L.P.

(57) ABSTRACT

A method and system are disclosed for efficiently storing and viewing data in a database. Data is stored in a nested data model which includes a plurality of nodes. A plurality of edges connect the plurality of nodes. Each edge has a unique edge name. A plurality of instances of data objects are associated with the nested data model. Each instance is associated with one of the edges such that the instance is also associated with that edge's name. An instance ordinal is associated with each instance which represents the number of times the edge associated with each instance is encountered during a traversal of the nested data model. The data stored utilizing the nested data model is accessed utilizing the instance ordinal and edge name associated with each of the plurality of instances, such that the data is accessed as being flat without flattening the nested data model.

20 Claims, 7 Drawing Sheets

METHOD AND SYSTEM FOR EFFICIENTLY STORING AND VIEWING DATA IN A DATABASE

BACKGROUND OF THE INVENTION

1. Technical Field

The present invention relates in general to data processing systems and, in particular, to a method and system in a data processing system for efficiently storing and viewing data in a database. Still more particularly, the present invention relates to a method and system in a data processing system for viewing data stored in a database as being flat, where the data is stored utilizing a nested data model without flattening the nested data model.

2. Description of the Related Art

Data may be stored in a database and viewed utilizing one of several different data models. An unnested data model is a type of hierarchical data model where the data is organized and stored where each node of the model has only one owner. The edges point to the nodes owned by the parent node. An edge represents a unique instance of a data object. In an unnested model, each edge represents only one instance of data.

For example, FIG. 1 depicts a pictorial representation of an unnested data model of data. In this example, a node named "V1" owns one instance of a node named "V2" and two instances of a node named "V3". The single instance of V2 is named "A" and is represented by edge "A". The first instance of V3 is named "B", and the second instance of V3 is named "C". The first instance of V3 is represented by edge "B", and the second instance is represented by edge "C".

A nested data model is a type of hierarchical data model where the data is organized and stored where each node of the model has one or more owners. Unlike an unnested data model where each edge represents only one instance of data, in a nested data model, each edge may represent multiple instances of data. FIG. 2 illustrates a pictorial representation of a nested model of the same data stored utilizing the unnested model of FIG. 1.

In a nested model, a single node may have multiple edges leading into a node and multiple edges leading out of a node. Vertices V3, V4, and V5 all have multiple edges leading into them. There are multiple paths to traverse to a vertex or an edge. A path is a collection of all edges traversed from a top node to reach a destination edge. For example, there are three different paths to traverse from vertex V1 to edge H. The first path is from "A" to "E" to "H". The second path is from "B" to "F" to "H". And, the third path is from "C" to "F" to "H". There are three different instances of the data represented by edge H. These three instances are named "A.E.H.", "B.F.H", and "C.F.H". Although the nested model includes only one edge named "H", there are actually three different instances of that edge, i.e. the data, in the model.

A flat data model is one which has no hierarchical structure and in which the data is stored where a parent node may have multiple dependent nodes. However, the dependent nodes do not have any dependent nodes. FIG. 3 illustrates a flat data model of the same data represented in the hierarchical model of FIG. 1. In the flat data model of FIG. 3, only the leaf instances of the data are stored. The leaf instances are those instances of data represented by a node which do not own another node. For example, in FIG. 3, nodes A.D., A.E.H., and A.E.I. are some of the leaf instances.

As is readily apparent from these figures, storing data utilizing an unnested data model requires more data storage space than storing data utilizing the flat model. The unnested and flat models may both be utilized so that an application may view the data as flat. An application cannot, however, utilize the nested model to view the data as flat. The data must be unfolded from the nested model into either the flat model or the unnested model in order for an application to view the data as flat.

Some programs need to distinguish between the different instances of an edge, and therefore cannot easily utilize a nested model. For example, a program may need to attach some property to each instance of an edge. The value of the property may vary from one of the instances of the edge to the others. Since there is only one H edge in the nested model, storing three different values of the properties with each instance is difficult.

Programs that need to distinguish between the different instances of an edge must either build an unnested model or flatten the data. An unnested model is built by transforming the nested model into an unnested model. To do this, the vertices must be copied so that each vertex has at most only one edge leading into it. However, for large nested models, building an unnested or flattened model is impractical or may be impossible due to the much larger data storage space required for these models.

Therefore, a need exists for a method and system in a data processing system for efficiently storing data in a database utilizing a nested data model and permitting the viewing of the data as flat without flattening the data.

SUMMARY OF THE INVENTION

It is therefore one object of the present invention to provide an improved data processing system.

It is another object of the present invention to provide a method and system in a data processing system for efficiently storing and viewing data in a database.

It is yet another object of the present invention to provide a method and system in a data processing system for viewing data stored in a database as being flat, where the data is stored utilizing a nested data model without flattening the nested data model.

The foregoing objects are achieved as is now described. A method and system are disclosed for efficiently storing and viewing data in a database. Data is stored in a nested data model which includes a plurality of nodes. A plurality of edges connect the plurality of nodes. Each edge has a unique edge name. A plurality of instances of data objects are associated with the nested data model. Each instance is associated with one of the edges such that the instance is also associated with that edge's name. An instance ordinal is associated with each instance which represents the number of times the edge associated with each instance is encountered during a traversal of the nested data model. The data stored utilizing the nested data model is accessed utilizing the instance ordinal and edge name associated with each of the plurality of instances, such that the data is accessed as being flat without flattening the nested data model.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
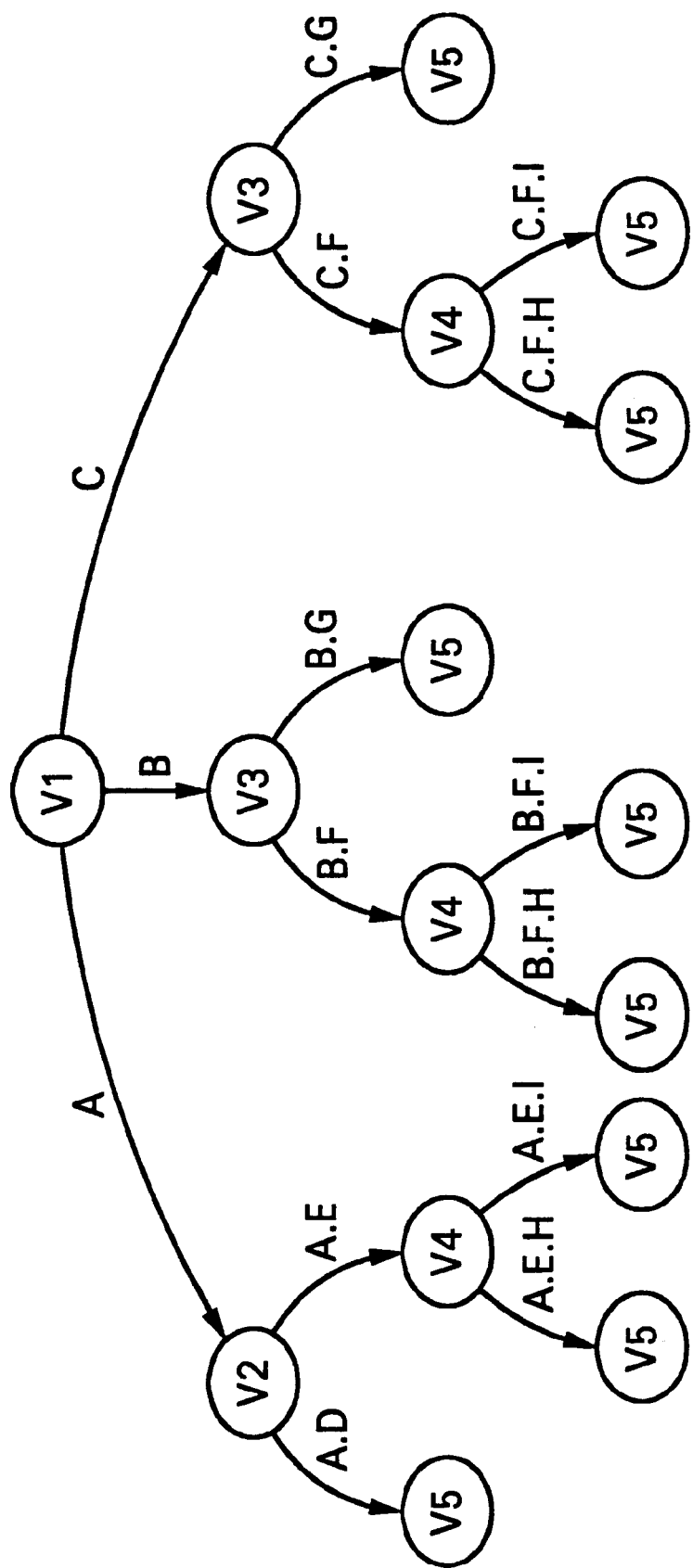
FIG. 1 is a pictorial representation of an unnested model of data in accordance with the prior art.
Figure 2:
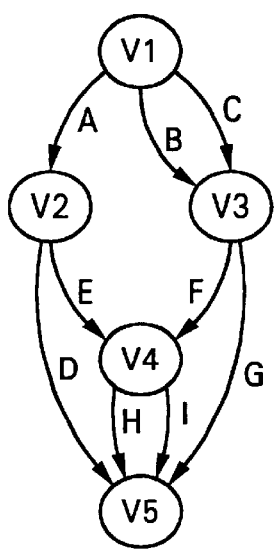
FIG. 2 is a pictorial representation of a nested model of data in accordance with the prior art.
Figure 3:
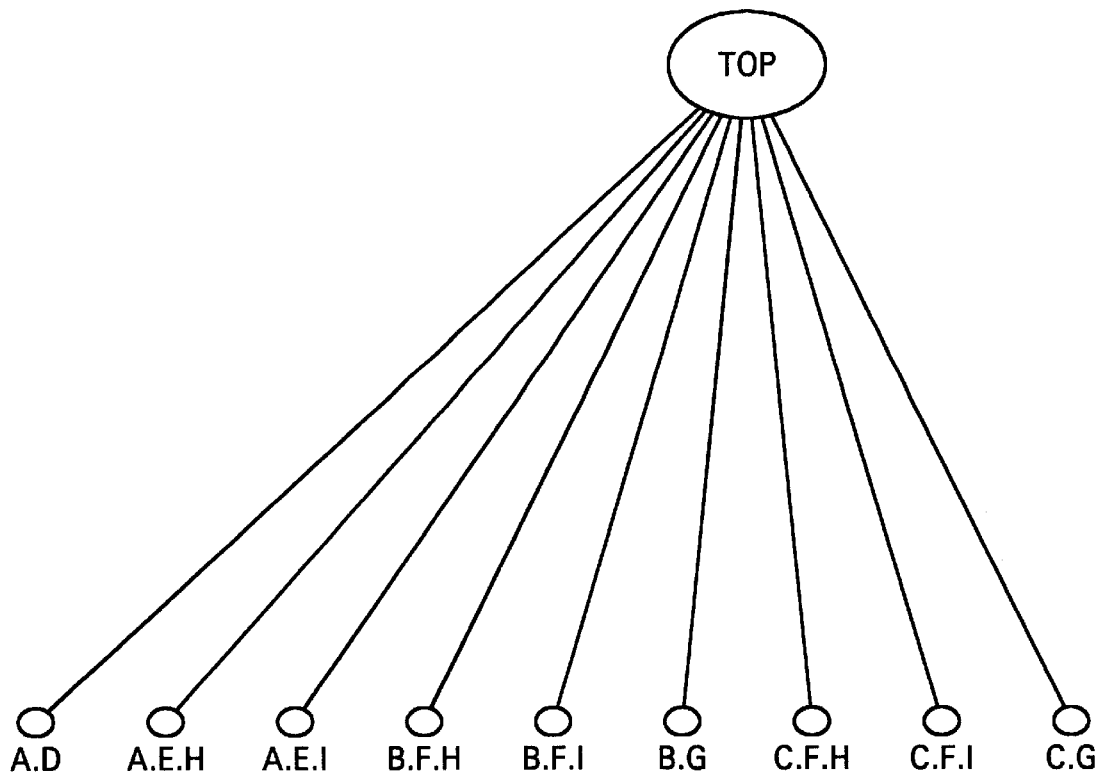
FIG. 3 is a pictorial representation of a flattened model of data in accordance with the prior art.

A preferred embodiment of the present invention and its advantages are better understood by referring to FIGS. 1–8 of the drawings, like numerals being used for like and corresponding parts of the accompanying drawings.

In accordance with the method and system of the present invention, data may be stored utilizing a nested model which requires less data storage space than an unnested model, but which provides equivalent functionality of the unnested model.

It often becomes necessary to view data stored utilizing a nested model as a flat file. Data may be viewed in known systems as flat when it is represented in accordance with an unnested data model, or a flattened model. Data may not be viewed as flat when it is represented in accordance with a nested data model. When data is represented as a nested data model, it must be "flattened" by representing it in an unnested data model format, or in a flattened model format. Therefore, in known systems, if data is stored utilizing a nested model, the data must be flattened and stored utilizing either the unnested model or flat data model.

The present invention achieves equivalent functionality of an unnested data model where the data is stored utilizing a nested model. Instance ordinals, edge information, and traversal identifiers are utilized to achieve this equivalent functionality. The present invention provides for an association of each instance of data of the nested model with an instance ordinal. The instance ordinal is utilized to uniquely identify each occurrence of a data object within the nested model. The instance ordinal is especially useful when there are multiple occurrences of a data object in the nested data model.

The present invention also provides a plurality of arrays which are utilized to view the data stored in the nested model as flat. Each array includes multiple entries. Each entry in each array is associated with a unique one of the instances of the nested model. The instance ordinal for each instance is stored in a first array. The second array includes pointers to the edge associated with each entry in the second array which is also associated with a particular one of the plurality of instances. In this manner, each instance of data has an associated instance ordinal and an edge name.

The present invention provides for a traversal identifier which may be utilized when an identification of an instance's name needs to be made. Utilizing the traversal identifiers, and the arrays, the present invention permits any type of traversal that may be completed utilizing an unnested model while maintaining only a nested model of data. In this manner, a virtual unnested model is built from a nested model utilizing the present invention.

In order to utilize the present invention, data is stored utilizing a nested data model. A first array for storing instance ordinals is established. Each entry in the first array is associated with a different one of the instances of the data objects in the nested model. Next, a second array is established for storing edge information. Each entry in the second array is likewise associated with a different one of the instances of the data objects of the nested model.

The nested model is then traversed. During the traversal, a counter is utilized to count each time an edge is encountered. The counter is initialized with a value of "0" for the top node, or vertex, of the model. In this manner, each instance of data objects is counted and associated with the current counter value. The counter value associated with each instance may be used as described below as an index to first array 300 and second array 304 to locate the entry in first array 300 and the entry in second array 304 which is associated with that particular instance.

Traversal identifiers (ID's) are created when an edge is encountered during the traversal for the first time. When an edge is encountered during the traversal, the current value of the counter is incremented by a value of "1". When an edge is encountered for the first time, the current value of the counter is associated with the edge as the edge's traversal identifier. When an edge is subsequently encountered, the traversal identifier remains the same, but the counter is incremented.

Each node, or vertex, also has an associated traversal identifier. The traversal identifier for each vertex is equal to the traversal value of the edge which first lead to the vertex during the traversal. Subsequent encounters of the vertex will not change the vertex's traversal identifier. When a vertex is encountered, the counter value is not changed.

When an edge is encountered for the first time during the traversal, it is also associated with an instance ordinal equal to "1". Each subsequent encounter of the same edge in the nested model will cause the instance ordinal for that instance of the edge to be incremented, and the incremented number to be associated with this instance of the edge as the instance ordinal. In this manner, each instance of an edge will have an instance ordinal associated with it. Each instance ordinal is stored in the entry of the first array associated with that particular instance.

During the initial traversal of the nested model to fill the first and second arrays, each time an edge is encountered, a pointer to that edge is stored in the second array in the entry of the array associated with the instance of data currently being traversed. Therefore, each entry in the second array will include a pointer to an edge in the nested model, where the second array entry is associated with an instance of that edge.

After the arrays are filled, the data stored in the nested model may be viewed as flat utilizing the arrays and traversal identifiers even though the data is represented by a nested data model. The data may be traversed in any manner which could have been utilized to traverse an unnested model, without the need for representing the data utilizing an unnested model. The arrays and traversal identifiers are utilized as described below to correctly identify any instance of any edge in the nested model encountered during a traversal of the nested model.

Each instance of a particular edge having multiple instances may have unique properties associated with the instance. Utilizing the method and system of the present invention, the data object represented by the edge need be stored only once. Each property for each of the instances of the edge is also stored associated with the instance ordinal associated with that instance. In order to later retrieve the property associated with a particular instance of that edge, the instance ordinal may be utilized as a key to uniquely identify the property associated with that particular instance.

Figures 4A, 4B, 4C:
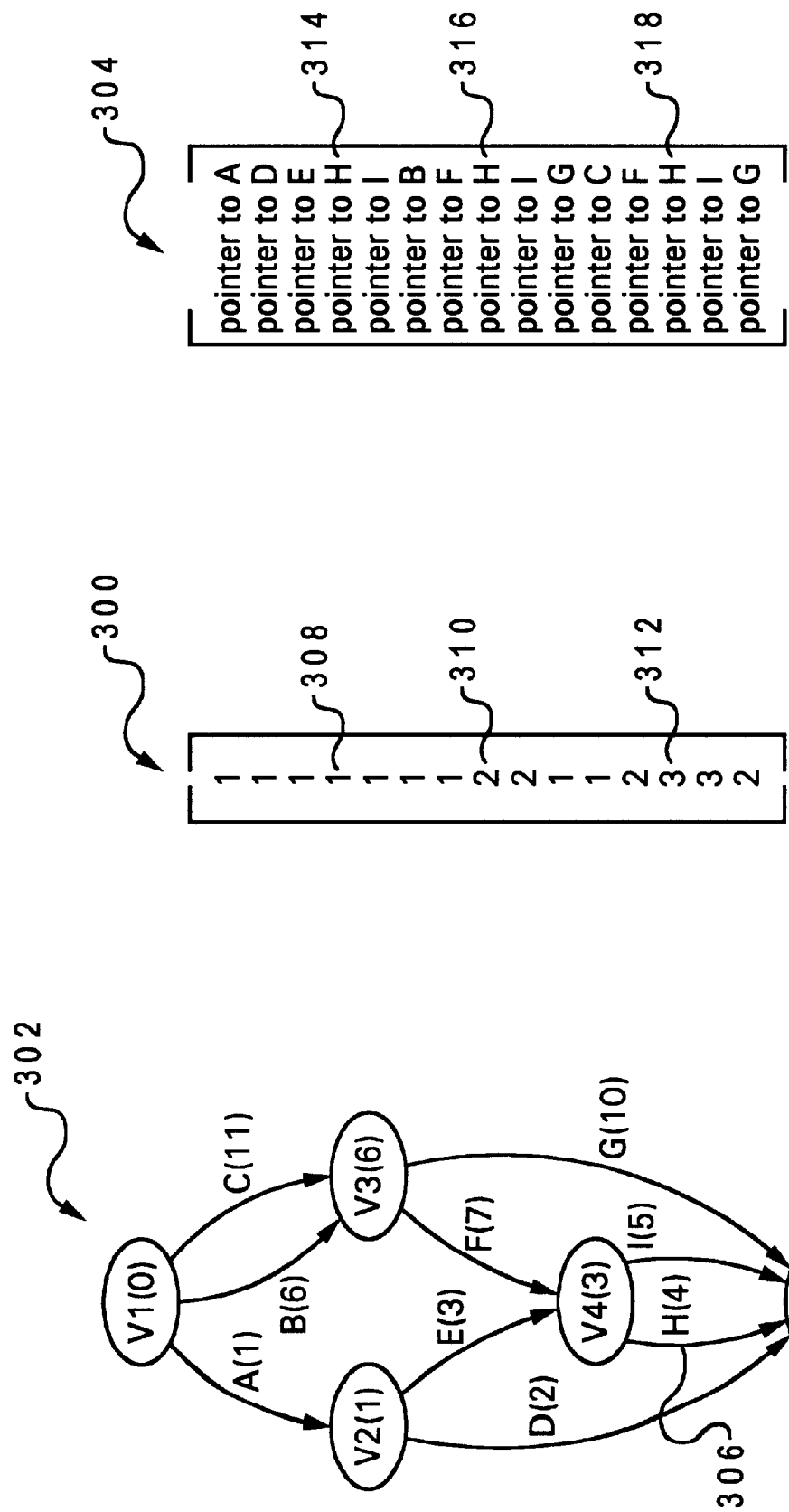
FIG. 4A depicts a pictorial representation of a nested model of data in accordance with the method and system of the present invention.
FIGS. 4B and 4C depict a pictorial representation of a plurality of arrays in accordance with the method and system of the present invention.

FIG. 4A depicts a pictorial representation of a nested model of data in accordance with the method and system of the present invention. FIGS. 4B and 4C depict a pictorial representation of a plurality of arrays in accordance with the method and system of the present invention. A first array 300 is depicted having 15 entries. Each entry of first array 300 is associated with a different instance of one of the data objects of the nested model 302. Each of the different instances is associated with a different index value. The index value identifies a particular instance, and may be utilized to access the entry of first array 300 which is associated with a particular instance. The content of each entry of first array 300 includes an instance ordinal which is associated with the instance associated with the entry.

A second array 304 is illustrated also having 15 entries. Each entry of second array 304 is also associated with a particular instance of one of the data objects represented by the edges of the nested model 302. Second array 304 is accessed in a manner similar to first array 300 utilizing a counter value as an index to identify an entry associated with a particular instance.

Nested model 302 includes the traversal identifiers associated with each edge and vertex, shown in parentheses. The nested model was traversed first through edge "A", edge "B", and then edge "C". Therefore, upon encountering edge "A", since this is the first time this edge was encountered during the traversal, an instance ordinal equal to "1" is stored in first array 300 in the first entry. A traversal identifier of "1" is also associated with this edge. A pointer to edge "A" is stored in the first entry of second array 304. The first instance of the data object represented by vertex V2 is named "A", is associated with a counter value of "1", and is also associated with the first entries in both first array 300 and second array 304. Because this is the first time this edge is encountered during the traversal, an instance ordinal of "1" is stored in the first entry of first array 300. A pointer to edge "A" is stored in the first entry of second array 304.

Next, the nested model is traversed to edge "D" which represents an instance named "A.D.". The counter is incremented to "2". Because this is the first time edge D is traversed, an instance ordinal equal to "1" is stored in first array 300 in the second entry. A traversal identifier of "2" is associated with this edge. A pointer to edge "D" is stored in the second entry of second array 304.

The traversal continues to edge "E" which represents an instance named "A.E.". The counter is incremented to "3". Because this is the first time instance A.E. is traversed, an instance ordinal equal to "1" is stored in first array 300 in the third entry. A traversal identifier of "3" is also associated with this edge. A pointer to edge "E" is stored in the third entry of second array 304.

The traversal continues to edge "H" which represents an instance named "A.E.H.". The counter is incremented to "4". Because this is the first time instance A.E.H. is traversed, an instance ordinal equal to "1" is stored in first array 300 in the fourth entry. A traversal identifier of "4" is also associated with this edge. A pointer to edge "H" is stored in the fourth entry of second array 304.

The traversal continues as described until edge "H" is reached through a traversal of path B.F.H. The counter equals "8" when edge "H" is reached through this traversal. This is the second time edge "H" has been traversed. This is the eighth instance that has been traversed. Therefore, an instance ordinal equal to "2" is stored in the eighth entry in first array 300. A traversal identifier of "4" is still associated with this edge. The traversal identifier will not change even though edge "H" is reached a total of three times. A pointer to edge "H" is stored in the eighth entry of second array 304.

Edge "H" 306 appears only once in nested model 302. However, during a traversal of nested model 302, edge "H" is encountered three different times. Thus, there are three different instances of data objects which include the data represented by edge "H". The instances of edge "H" are associated with the fourth, eighth, and thirteenth entries of both arrays. The fourth entry represents the first instance of the edge. Therefore, an instance ordinal of "1" is stored in entry 308. The eighth entry represents the second instance of the edge. Therefore, an instance ordinal of "2" is stored in entry 310. The thirteenth entry represents the third instance of edge "H". Therefore, an instance ordinal of "3" is stored in entry 312. Each entry in second array 304 which is associated with one of the instances of edge "H", entries 314, 316, and 318, include a pointer to edge "H".

The traversal continues until each instance is traversed and the arrays are filled.

The method and system of the present invention may be utilized to view data stored utilizing a nested model as flat. Any type of service request which could be performed utilizing flattened data or an unnested model of data may also be performed utilizing data stored in the nested model, the instance ordinals, traversal identifiers, and the two arrays. The following are examples of only some of the service requests which may be performed utilizing the present invention.

When a programmer desires to determine a name for a particular instance of data, the counter value, traversal identifiers, and arrays may be utilized to view data stored utilizing a nested model as flat.

Because the data may be viewed as flat even though it is not represented by a flat or unnested data model, any request that could be serviced utilizing a flat or unnested data model may also be serviced using the data as represented utilizing the present invention.

An edge name may be generated by first determining the current counter value. During a traversal, a counter is maintained as known in the art. In accordance with the present invention, the counter value is utilized as an index to access second array 304 by accessing the entry associated with the counter value. The edge pointer stored in that entry is output which is the edge name associated with the edge currently being traversed. The parent edge name for the current edge may be determined and then output utilizing:

$$\text{parent edge} = \text{counter value} - \text{current edge traversal identifier} + \text{edge's parent vertex's traversal identifier.}$$

The formula is repeated until the parent edge value is equal to zero. For example, if the current counter value is "13", which is associated with instance C.F.H., second array 304 is utilized looking at entry 13 to determine the current edge is "H". Edge H is associated with a traversal identifier of "4", and its parent vertex, V4, is associated with a traversal identifier of "3". The parent edge value is =13−4+3=12. The twelfth entry of second array 304 is accessed to determine the current edge is "F". Edge F is associated with a traversal identifier of "7", and its parent vertex, V3, is associated with a traversal identifier of "6". The parent edge value is now =12−7+6=11. The eleventh entry of second array 304 is accessed to determine the current edge is now "C". Edge C is associated with a traversal identifier of "11", and its parent vertex, V1, is associated with a traversal identifier of "0". The parent edge value is now =11−11+0=0. Therefore, the entire name for the third instance of "H" is output in reverse order, H.F.C.

Figure 5:
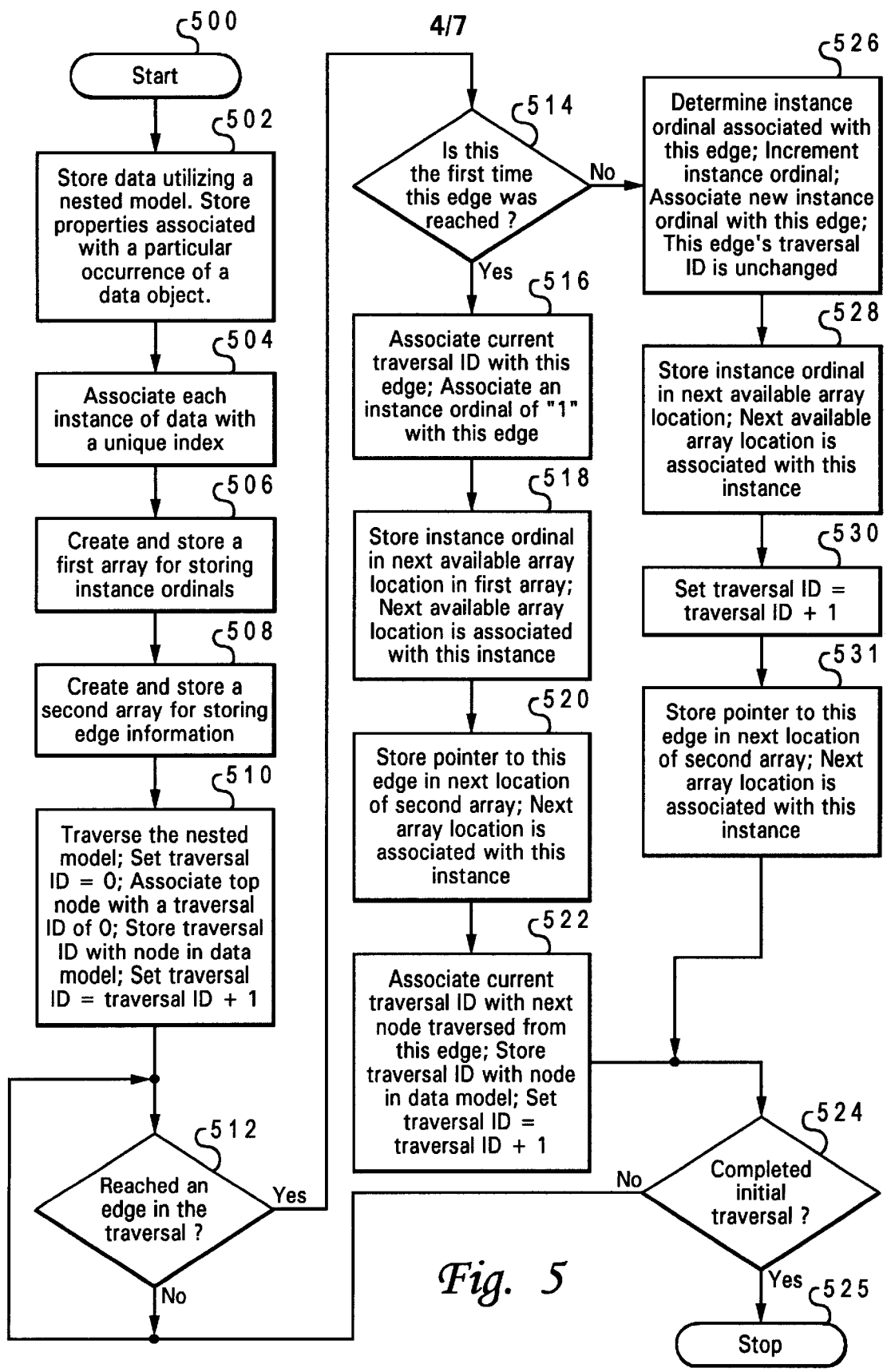
FIG. 5 is a high level flow chart illustrating the creation and storage of a nested model of data, the creation of a plurality of arrays, and the association of entries in these arrays which each edge of the nested model of data in accordance with the present invention.

FIG. 5 is a high level flow chart illustrating the creation of a nested model data, the creation of a plurality of arrays, and the association of entries in these arrays which each edge of the nested model in accordance with the present invention. The process starts as depicted at block 500 and thereafter passes to block 502 which illustrates the creation and storage of data utilizing a nested model. Properties which may be associated with an instance of a particular data object are also stored associated with a key value. The key value is utilized as described below to uniquely identify the particular data object with which a property is associated.

Next, block 504 depicts the association of each instance of data with a unique index. Thereafter, block 506 illustrates the creation and storage of a first array for storing instance ordinals.

The process then passes to block 508 which depicts the creation and storage of a second array for storing edge information. Next, block 510 illustrates the traversal of the nested data model. The traversal identifier is initially equal to "0". The top node of the model is associated with a traversal identifier of "0". This value is stored in the data model associated with the top node. The traversal identifier is then incremented by a value of "1". Thereafter, block 512 depicts a determination of whether or not an edge has been encountered during the traversal. If a determination is made that an edge has not been encountered, the process loops back to block 512.

If a determination is made that an edge has been encountered, the process passes to block 514 which illustrates a determination of whether or not this is the first time this edge has been traversed. If a determination is made that this is the first time this edge was encountered during the traversal, the process passes to block 516. Block 516 depicts the association of the current traversal identifier with this edge. An instance ordinal of "1" is also associated with this edge. Next, block 518 illustrates the storage of the instance ordinal in the next available array location in first array 300. The next available array location is associated with the current counter value which is also associated with this instance of the edge being traversed.

Thereafter, block 520 depicts the storage of a pointer to this edge in the next available location in second array 304. This array location is associated with the current counter value which is also associated with this instance of the edge being traversed. Block 522, then, illustrates the association of the current traversal identifier with the next node traversed from this edge. This traversal identifier value is stored in the data model associated with the next node. The traversal identifier is then set equal to the current traversal identifier plus one. The process then passes to block 524 which illustrates a determination of whether or not the initial traversal of the model has been completed. If a determination is made that the traversal has been completed, the process terminates as depicted at block 525. Referring again to block 524, if a determination is made that the initial traversal has not been completed, the process then passes back to block 512.

Referring again to block 514, if a determination is made that this is not the first time this edge was encountered, the process passes to block 526. Block 526 depicts the determination of the instance ordinal previously associated with this edge. The instance ordinal is then incremented by a value of "1". The new instance ordinal is associated with this current instance of this edge. The traversal identifier already associated with this edge remains unchanged. The process then passes to block 528 which illustrates the storage of the new instance ordinal associated with this instance in the next available array location in first array 300. The next available array location is associated with the current instance of the edge being traversed. Thereafter, block 530 depicts the setting of the traversal identifier equal to the traversal identifier plus one. Next, block 531 illustrates the storage of a pointer to this edge in the next location of the second array. The next location is associated with this instance. The process then passes back to block 524.

Figure 6:
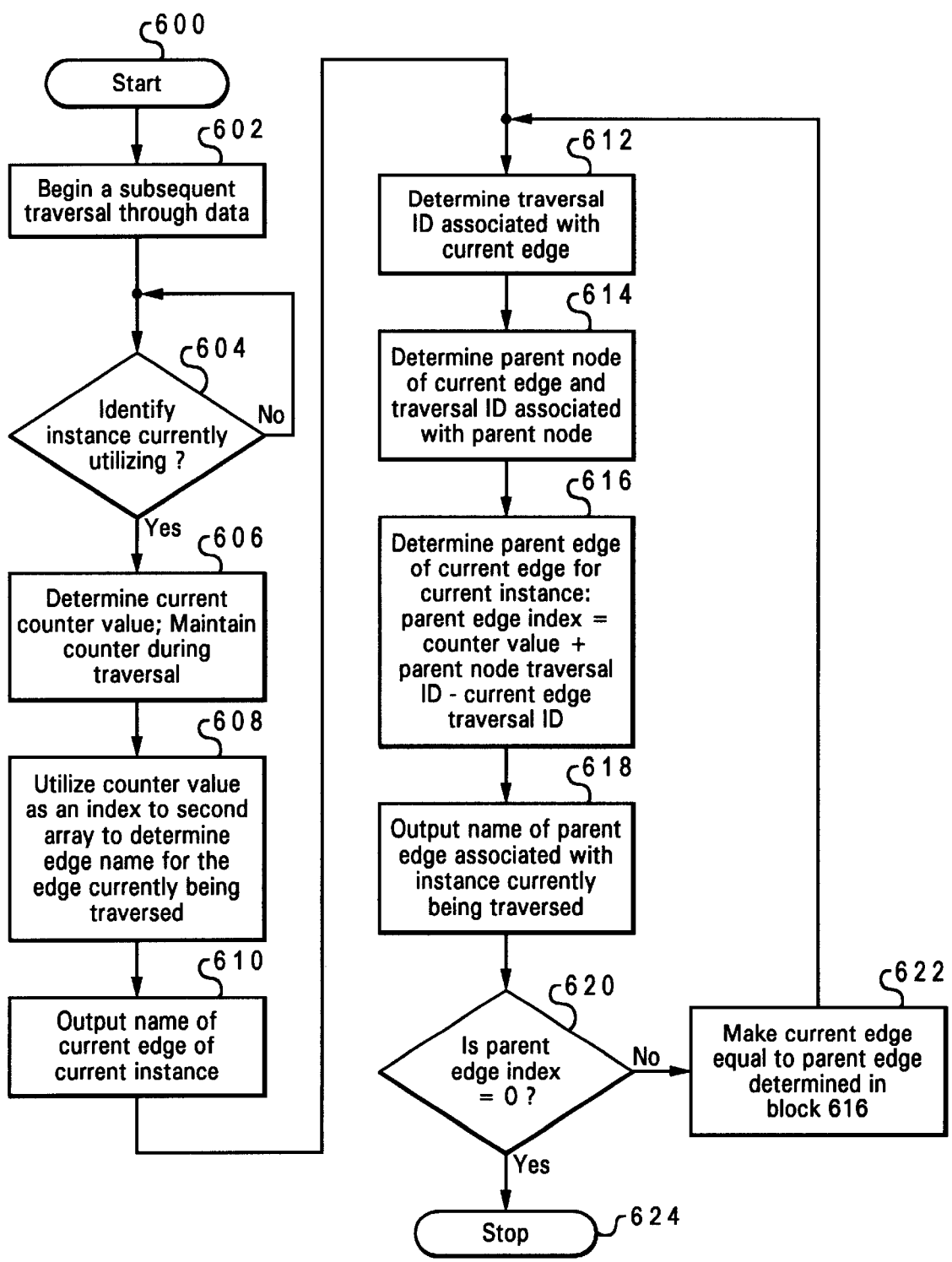
FIG. 6 is a high level flow chart depicting the utilization of a plurality of arrays, a counter value, and traversal identifiers to access a nested model of data utilizing database service requests typically utilized to access an unnested data model in accordance with the method and system of the present invention.

FIG. 6 is a high level flow chart depicting the utilization of a plurality of arrays, a counter value, and traversal identifiers to access a nested data model of data utilizing database service requests typically utilized to access an unnested data model in accordance with the method and system of the present invention. The process starts as depicted at block 600 and thereafter passes to block 602 which illustrates the beginning of a subsequent traversal of the data stored utilizing a nested data model. Next, block 604 depicts a determination of whether or not the instance of data currently being traversed is to be identified. If a determination is made that the data currently being traversed is not to be identified, the process passes back to block 604. If a determination is made that the data currently being traversed is to be identified, the process passes to block 606 which illustrates a determination of the current counter value. The counter is maintained as during the traversal as known in the prior art.

In accordance with the present invention, next, block 608 depicts the utilization of the current counter value as an index to the second array to determine an edge pointer associated with the edge currently being traversed. The edge pointer names the edge associated with this instance. Next, block 610 illustrates the outputting of the name of the edge associated with the instance currently being traversed. Thereafter, block 612 depicts the determination of a traversal identifier associated with the edge currently being traversed. Block 614, then, illustrates the determination of an identity of a parent node, or vertex, of the current edge, and the determination of the traversal identifier associated with that parent node.

The process then passes to block 616 which depicts the determination of the parent edge for the current instance utilizing the formula:

$$\text{parent edge index} = \text{counter value} + \text{edge's parent vertex's traversal identifier} - \text{current edge traversal identifier.}$$

Next, block 618 depicts the outputting of the name of the parent edge associated with the current instance being traversed. The process then passes to block 620 which illustrates a determination of whether or not the parent edge index is equal to zero. If a determination is made that the parent edge index is not equal to zero, the process passes to block 622 which illustrates making the current edge equal to the parent edge. The process then passes back to block 612. Referring again to block 620, if a determination is made that the parent edge index is equal to zero, the entire name for the current instance has been output. The process then terminates as depicted at block 624.

Figure 7:
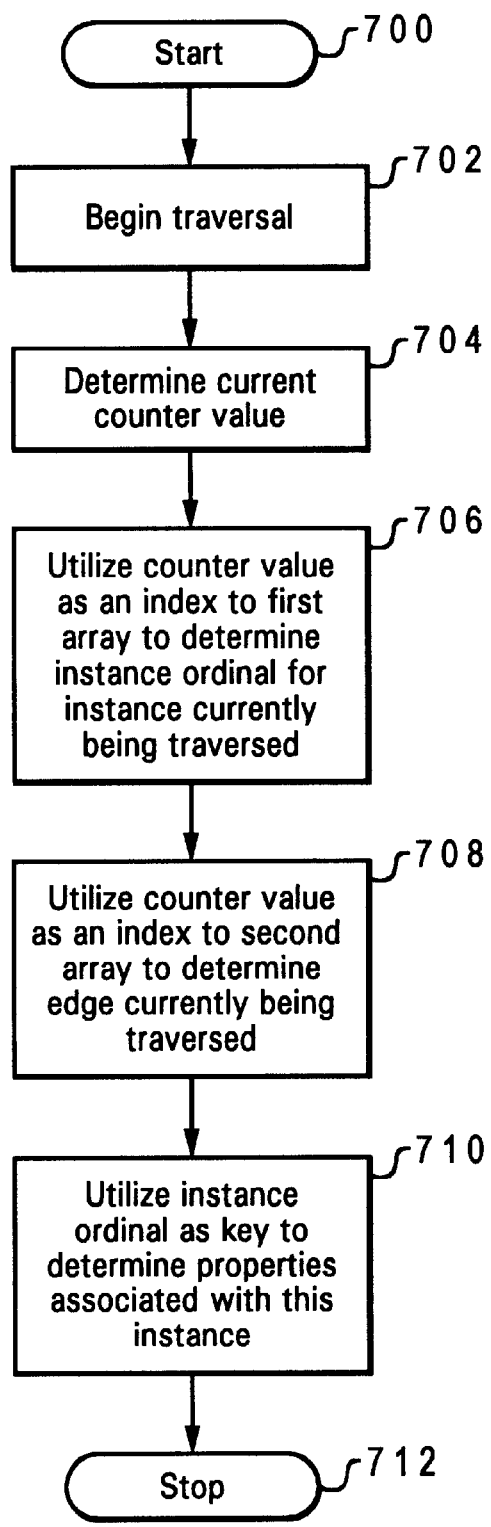
FIG. 7 is a high level flow chart depicting a utilizing of first and second arrays to determine properties associated with one of a plurality of occurrences of an edge in a nested model of data stored in a data processing system in accordance with the present invention.

FIG. 7 is a high level flow chart depicting a utilizing of first and second arrays to determine properties associated with one of a plurality of instances of data represented by an edge in a nested model of data stored in a data processing system in accordance with the present invention. The process starts as depicted at block 700 and thereafter passes to block 702 which illustrates the beginning of a subsequent traversal of the nested model of data. Next, block 704 depicts the determination of a current counter value. Thereafter, block 706 illustrates a utilization of the counter value as an index to the first array to determine the instance ordinal associated with the instance currently being traversed.

The process then passes to block 708 which depicts the utilization of the counter value as an index to the second array to determine the identity of the edge currently being traversed. Next, block 710 illustrates the utilization of the instance ordinal as a key to identify properties associated with this instance of the edge currently being traversed. The process then terminates as depicted at block 712.

Figure 8:
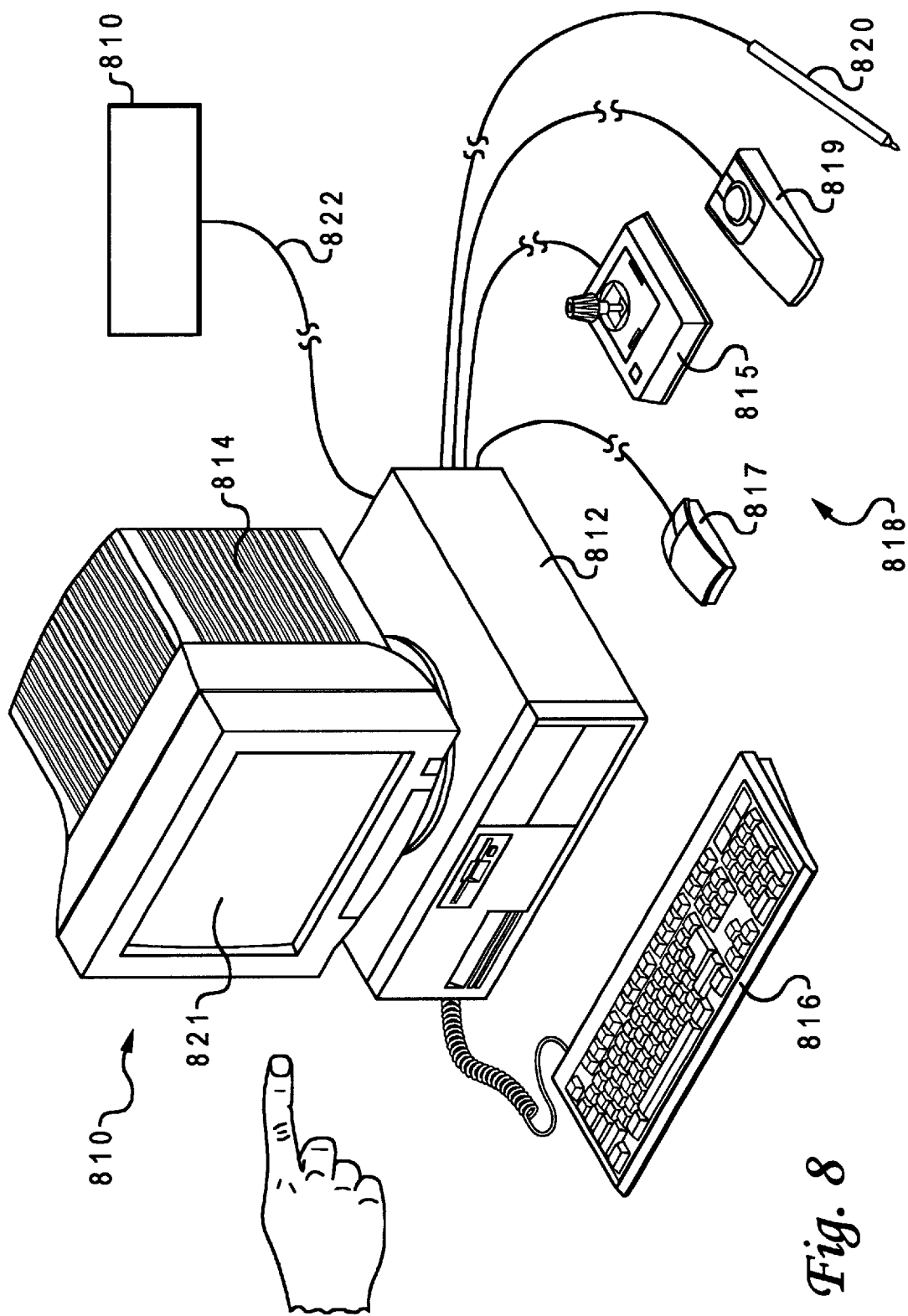
FIG. 8 illustrates a pictorial representation of a data processing which may be utilized to implement the method and system of the present invention.

FIG. 8 illustrates a pictorial representation of a data processing 810 which may be utilized to implement the method and system of the present invention. Data processing system 810 includes a computer 812, computer display screen 814, a keyboard 816, and multiple input pointing devices 818. Those skilled in the art will recognize that input pointing devices 818 may be implemented utilizing a pointing stick 815, a mouse 817, a track ball 819, a pen 820, and/or other devices that permit a user to manipulate objects in a graphical manner on screen 814. Those skilled in the art will also recognize that any number of data processing systems 810 may communicate with each other via a computer network 822. Any suitably configured data processing system 810 may be utilized to implement the method and system of the present invention.

While a preferred embodiment has been particularly shown and described, it will be understood by those skilled in the art that various changes in form and detail may be made therein without departing from the spirit and scope of the present invention.

What is claimed is:

1. A method in a data processing system for viewing data stored utilizing a nested data model as being flat, said method comprising the steps of:

storing a nested data model of said data, said nested data model including a plurality of nodes and a plurality of edges connecting said plurality of nodes, each of said plurality of edges having a unique edge name;

associating a plurality of instances of data objects with said nested data model, each of said plurality of instances being associated with one of said plurality of edges, wherein each of said plurality of instances is associated with an edge name associated with said one of said plurality of edges;

associating an instance ordinal with each of said plurality of instances representing a number of times said one of said plurality of edges associated with said each of said plurality of instances is encountered during a traversal of said nested data model; and accessing said data stored in nested data model utilizing said instance ordinal and said edge name associated with each of said plurality of instances, wherein said data is accessed as being flat without flattening said nested data model.

2. The method according to claim 1, further comprising the steps of:

during an initial traversal of said nested data model, associating a traversal identifier with each of said plurality of edges and each of said plurality of nodes; and accessing said data stored in said nested data model utilizing said traversal identifier associated with each of said plurality of edges and each of said plurality of nodes, and said instance ordinal and said edge name associated with each of said plurality of instances.

3. The method according to claim 2, further comprising the step of establishing a first array within said system including a plurality of fields for storing said instance ordinals associated with each of said plurality of instances.

4. The method according to claim 3, further comprising the step of establishing a second array within said system including a plurality of fields for storing edge information.

5. The method according to claim 4, further comprising the steps of:

during each subsequent traversal of said nested data model, maintaining a counter during said traversal, each value of said counter identifying a location within said data of said subsequent traversal, said location being associated with one of said plurality of instances; and utilizing a current value of said counter and said traversal identifiers to determine an instance name of one of said plurality of instances associated with a location associated with said current value of said counter.

6. The method according to claim 5, further comprising the step of associating each of said plurality of fields of said first array with a different one of said plurality of instances.

7. The method according to claim 6, further comprising the step of storing an instance ordinal associated with one of said plurality of instances in one of said plurality of fields of said first array associated with said one of said plurality of instances.

8. The method according to claim 7, further comprising the step of associating each of said plurality of fields of said second array with a different one of said plurality of instances.

9. The method according to claim 8, further comprising the step of storing an edge name associated with one of said plurality of instances in one of said plurality of fields of said second array associated with said one of said plurality of instances.

10. The method according to claim 9, further comprising the step of utilizing said first and said second arrays to determine an instance name of said one of said plurality of instances.

11. A data processing system for viewing data stored utilizing a nested data model as flat, comprising:

means for storing a nested data model of said data, said nested data model including a plurality of nodes and a plurality of edges connecting said plurality of nodes, each of said plurality of edges having a unique edge name;

means for associating a plurality of instances of data objects with said nested data model, each of said plurality of instances being associated with one of said plurality of edges, wherein each of said plurality of instances is associated with an edge name associated with said one of said plurality of edges;

means for associating an instance ordinal with each of said plurality of instances representing a number of times said one of said plurality of edges associated with said each of said plurality of instances is encountered during a traversal of said nested data model; and means for accessing said data stored in said nested data model utilizing said instance ordinal and said edge name associated with each of said plurality of instances, wherein said data is accessed as being flat without flattening said nested data model.

12. The system according to claim 11, further comprising:

means for during an initial traversal of said nested data model, associating a traversal identifier with each of said plurality of edges and each of said plurality of nodes; and means for accessing said data stored in said nested data model utilizing said traversal identifier associated with each of said plurality of edges and each of said plurality of nodes, and said instance ordinal and said edge name associated with each of said plurality of instances.

13. The system according to claim 12, further comprising means for establishing a first array within said system including a plurality of fields for storing said instance ordinals associated with each of said plurality of instances.

14. The system according to claim 13, further comprising means for establishing a second array within said system including a plurality of fields for storing edge information.

15. The system according to claim 14, further comprising:

means for during each subsequent traversal of said nested data model, maintaining a counter during said traversal, each value of said counter identifying a location within said data of said subsequent traversal, said location being associated with one of said plurality of instances; and means for utilizing a current value of said counter and said traversal identifiers to determine an instance name of one of said plurality of instances associated with a location associated with said current value of said counter.

16. The system according to claim 15, further comprising means for associating each of said plurality of fields of said first array with a different one of said plurality of instances.

17. The system according to claim 16, further comprising means for storing an instance ordinal associated with one of said plurality of instances in one of said plurality of fields of said first array associated with said one of said plurality of instances.

18. The system according to claim 17, further comprising means for associating each of said plurality of fields of said second array with a different one of said plurality of instances.

19. The system according to claim 18, further comprising means for storing an edge name associated with one of said plurality of instances in one of said plurality of fields of said second array associated with said one of said plurality of instances.

20. The system according to claim 19, further comprising means for utilizing said first and said second arrays to determine an instance name of said one of said plurality of instances.

* * * * *